United States Patent [19]

Okada

[11] Patent Number: 4,800,720

[45] Date of Patent: Jan. 31, 1989

[54] EXHAUST SYSTEM FOR INTERNAL COMBUSTION ENGINE

[75] Inventor: Makoto Okada, Tachikawa, Japan

[73] Assignee: Nissan Motor Co., Ltd., Yokohama City, Japan

[21] Appl. No.: 904,295

[22] Filed: Sep. 8, 1986

[30] Foreign Application Priority Data

Sep. 10, 1985 [JP] Japan .................................. 60-138435

[51] Int. Cl.⁴ ............................................. F02B 27/02
[52] U.S. Cl. ...................................... 60/313; 181/240
[58] Field of Search .......................... 60/313, 312, 314; 181/240

[56] References Cited

U.S. PATENT DOCUMENTS 3,813,880 6/1974 Reid ........................................ 60/314

FOREIGN PATENT DOCUMENTS

| 2101079 | 8/1972 | Fed. Rep. of Germany | ........ 60/313 |
| 60-2675 | 1/1985 | Japan . | |
| 230510 | 11/1985 | Japan | ..................................... 60/312 |
| 995528 | 6/1965 | United Kingdom | ................. 181/240 |

Primary Examiner—Douglas Hart
Attorney, Agent, or Firm—Foley & Lardner, Schwartz, Jeffery, Schwaab, Mack, Blumenthal & Evans

[57] ABSTRACT

In order to prevent the formation of a standing wave in the exhaust system one or more small transfer passages are formed either in the body of the manifold or in the cylinder head. These passages permit exhaust pressure to be transmitted to the exhaust ports of the adjacent cylinders as well as into the exhaust conduiting. This destructively interferes with the formation of the standing wave and thus obviates the generation of exhaust noise.

11 Claims, 6 Drawing Sheets

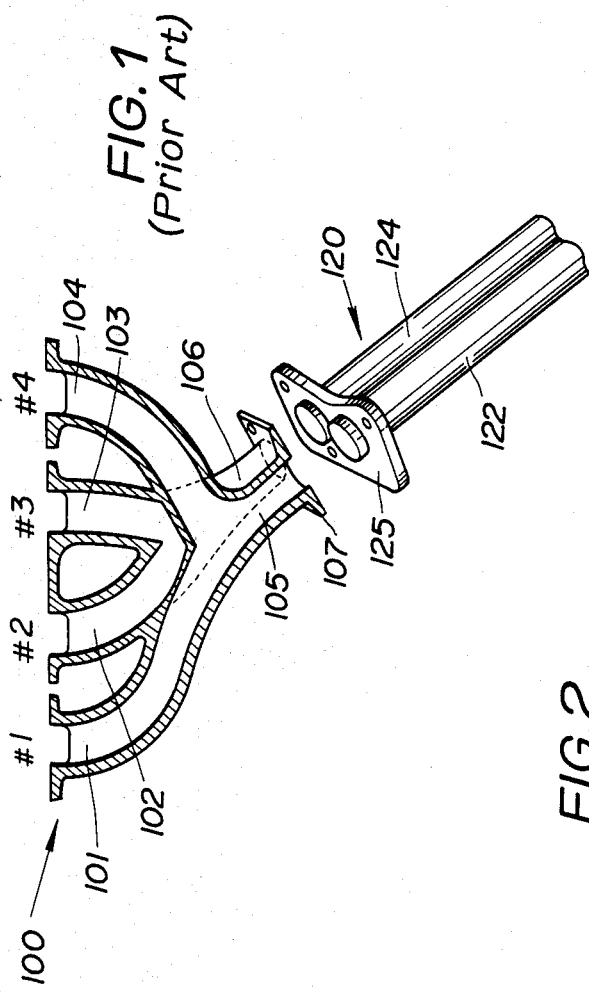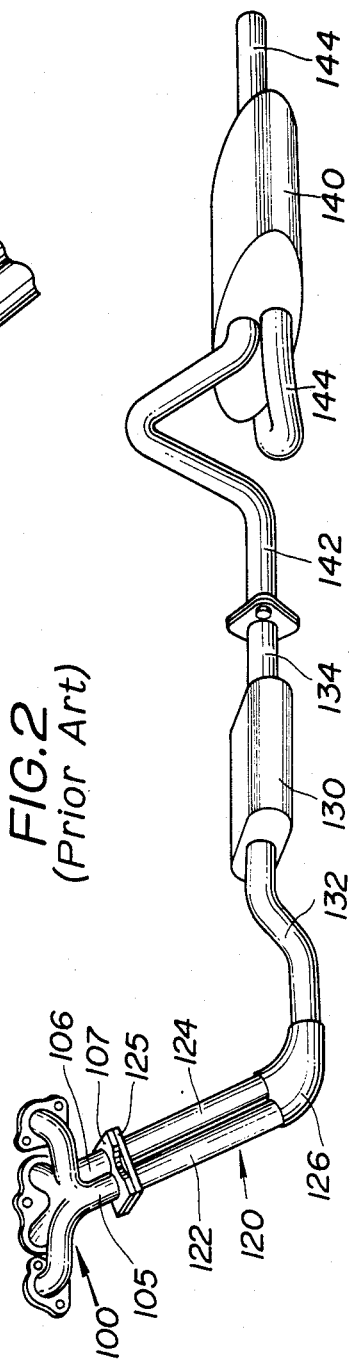

EXHAUST SYSTEM FOR INTERNAL COMBUSTION ENGINE

BACKGROUND OF THE INVENTION

1. Field of the Invention

The present invention relates generally to an exhaust system for an automotive vehicle and more specifically to a exhaust system which suppress exhaust noise.

2. Description of the Prior Art

FIG. 1 of the drawings shows a previously proposed arrangement disclosed in Utility Model Provisional Publication No. 58-134620. This arrangement includes an exhaust manifold 100 for a four cylinder in-line internal combustion engine and which is formed in a manner that branch runners 101, and 105 communicate with exhaust ports of cylinders #1 and #4 while the remaining two branch runners 102 and 103 communicate with ports of cylinders, #2 and #3. As shown, branch runners 101 & 104 and 102 & 103 are merged to form collector sections 105 and 106 respectively and thus define two isolated or discrete exhaust passage structures.

The collector sections 105, 106 communicate with a front tube arrangement 120 which in this instance is formed of first and second discrete conduits 122 and 124. The manifold 100 and the front tube 120 arrangement are provided with flanges 107 and 125 which are detachably interconnected by bolts. The downstream end of the front tube arrangement is provided with a collector-like junction member 126 which fluidly interconnects the downstream ends of conduits 122 and 124. A pre-muffler 130 is fluidly communicated at its upstream end with the junction member 126 via a first connection conduit 132 and at its downstream end with a main muffler 140 via a second connection conduit 134 and a center tube 142. A tail tube 144 leads from the main muffler to the ambient atmosphere.

The firing order of the engine is arranged to be #1 - #3 - #4 - #2. Accordingly, with the above arrangement exhaust gas slugs or pulses are supplied alternatively into the above mentioned separate passage structures of the manifold in a manner which promotes filling efficiency and reduces backpressure.

However, this arrangement has suffered from the drawback that under certain conditions such as during rapid acceleration or during a transition between high engine speed and low engine speed a metallic exhaust noise containing a high frequency component is produced.

Initially this noise was thought to be caused by combustion in the exhaust system of residual fuel contained in the exhaust gases. However, measurement revealed that during deceleration with the throttle valve closed and the engine motoring there was insufficient fuel in the exhaust gases to enable the generation of the noise in question. It was then determined that the cause of the noise was due to the formation of a standing wave in the exhaust conduiting which is converted into a shockwave as it moves through the main muffler and tail tube.

More specifically, the mechanism via which the noise is generated is deemed to be such that as exhaust gases are released into the exaust manifold (for example into branch runner 101 from cylinder #1) the pressure wave is trasmitted via collector section 105 and conduit 122 to the junction member 126. Upon reaching this point in the system the wave is transmitted to the pre-muffler 130 via conduit 132 and also back toward the engine via conduit 124 and collector section 106. However, as the exhaust valves of the cylinders associated with branch runners 102 and 103 are still closed at this time the pressure wave which has run back toward the engine tends to be be reflected to form a reflected wave which then propagates back toward the junction member 126. Subsequently, the next slug of exhaust gas is released from the engine (for example from cylinder #3 into branch runner 103) and follows the reflected wave. Under given operational conditions these waves tend to cooperate in a manner which produces a kind of resonance and establishes a large amplitude standing wave. This standing wave is converted into a shock wave as its moves through the front tube 120, center tube 142, main muffler 140 and tail tube 144 and generates an audible metallic exhaust noise which includes a high frequency component.

SUMMARY OF THE INVENTION

It is an object of the present invention to provide an exhaust system which obviates the formation of a standing wave in the exhaust system during given modes of the engine operation and which therefore prevents the undesirable generation of the above mentioned type of exhaust noise.

In brief, the above object is achieved by an arrangement wherein in order to prevent the formation of a standing wave in the exhaust system small transfer passages are formed either in the body of the manifold or in the cylinder head. These passages permit exhaust pressure to be transmitted to the exhaust ports of the adjacent cylinders as well as into the exhaust conduiting. This destructively interferes with the formation of the standing wave and thus obviates the generation of the exhaust noise in question.

More specifically, the present invention takes the form of a system which includes a multi-cylinder internal combustion engine; a cylinder head including a plurality of exhaust ports each of which is associated with a cylinder of the engine; exhaust conduiting which leads to the ambient atmosphere; a manifold which fluidly interconnects the conduiting and the exhaust ports, the manifold being formed with first and second fluidly discrete passage structures which communicate with first and second groups of the exhaust ports respectively; and transfer passage means formed in one of the cylinder head and the manifold for transmitting exhaust gas pressure between the first and second discrete passage structures.

BRIEF DESCRIPTION OF THE DRAWINGS

FIGS. 1 and 2 show the prior art arrangement discussed in the opening paragraphs of the instant disclosure;

DESCRIPTION OF THE PREFERRED EMBODIMENTS

Figure 3:
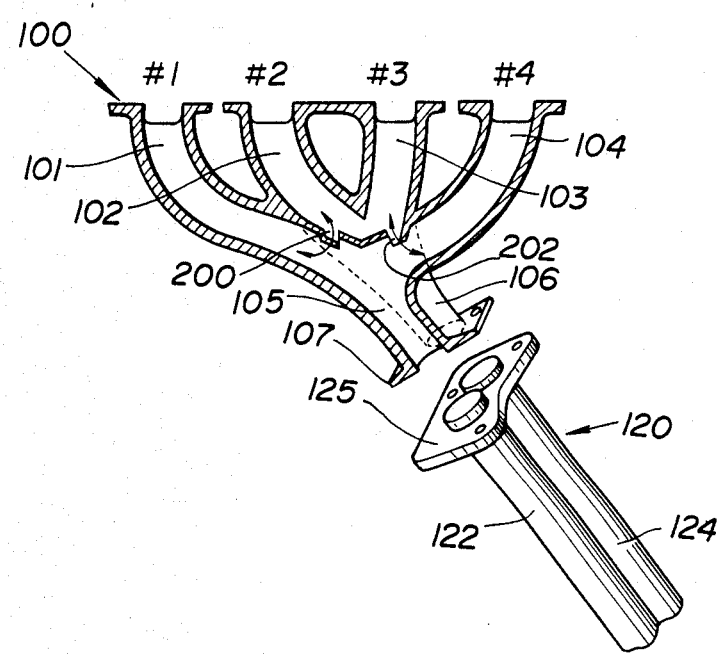
FIGS. 3 and 4 show a first embodiment of the present invention.
Figure 4:
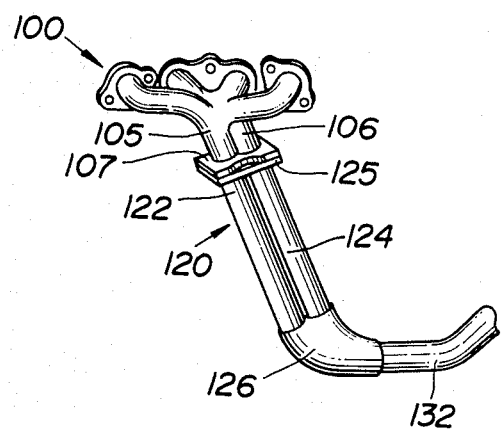

FIGS. 3 and 4 show a first embodiment of the present invention. As the construction and arrangement is essentially similar to the arrangement shown in FIGS. 1 and 2 a detailed description of the same will be omitted for brevity and the same reference numerals used to denote similar parts of the embodiments of this and subsequent embodiments of the present invention.

In the first embodiment two transfer ports 200, 202 are formed in the exhaust manifold 100 in a manner which fluidly intercommunicates branch runner 101 with branch runner 102 and branch runner 103 with branch runner 104. As shown the transfer ports 200, 202 are formed immediately upstream of the collector sections 105, 106.

With this arrangement when the engine is running and the exhaust valve of cylinder #1 opens (for example) and permits a slug of exhaust gas to be released into branch runner 101. The pressure wave associated with this release of exhaust gas is permitted to propagate toward collector section 105, conduit 122 and junction member 126. Simultaneously it is permitted to enter branch runner 102 via transfer port 200. With this, even though a reflected wave still tends to be produced in manner set forth hereinabove the introduction of the pressure wave into the other of the two discrete exhaust passage structures, suppresses the formation of a large amplitude standing wave upon the release of the next slug of exhaust gases (from cylinder #3 for example) into the same.

Hence, the generation of the metallic exhaust noise produced with the above discussed prior art is obviated.

Figure 5:
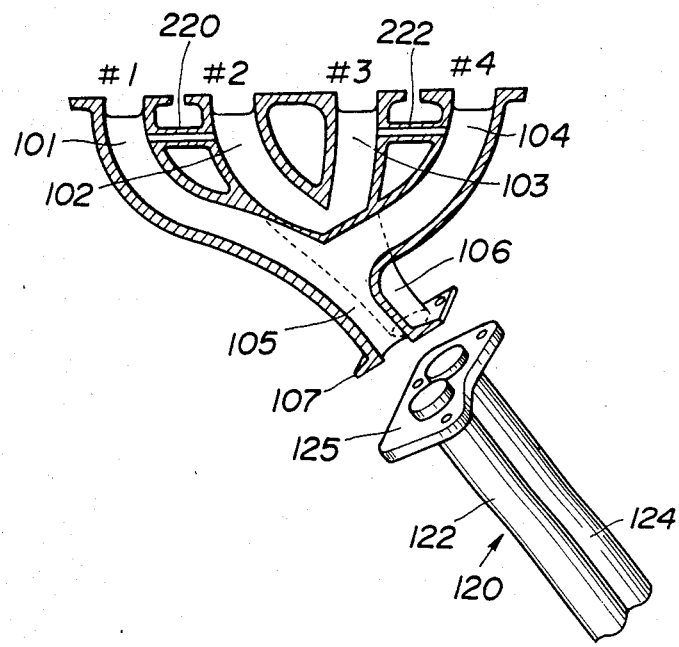
FIGS. 5 & 6, 7 & 8 and 9 & 10 show second, third and fourth embodiments of the present invention respectively.
Figure 6:
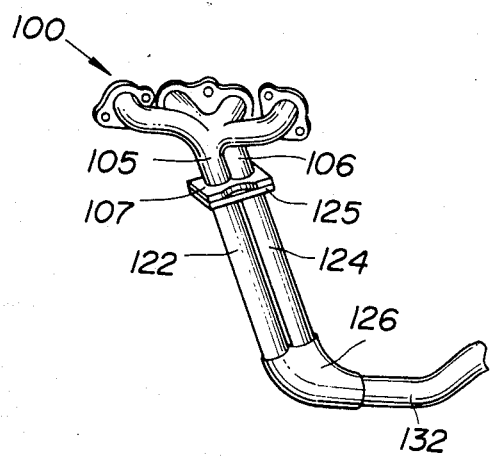

FIGS. 5 and 6 show a second embodiment of the present invention. In this arrangement small essentially circular small cross sectional area transfer passages 220, 222 are formed in a manner which interconnect the upstream ends of branch runners 101, 102 and branch runners 103, 104 respectively. This arrangement produces essentially the same effect as the first embodiment.

Figure 7:
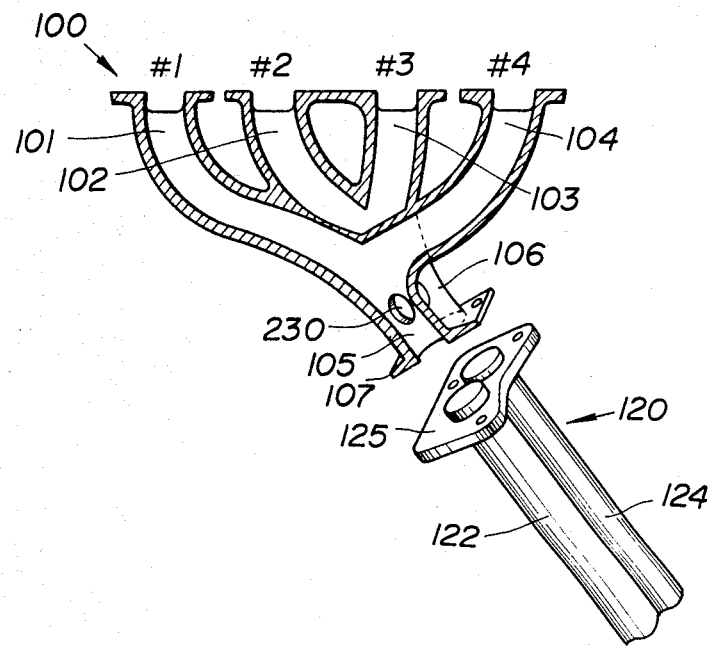
Figure 8:
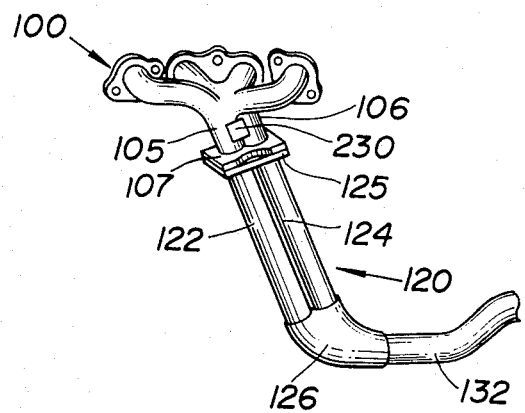

FIGS. 7 and 8 show a third embodiment of the present invention. In this arrangement a single circular cross section transfer passage 230 is formed in a manner to fluidly communicate the collector sections 105, 106 of the manifold 100. This arrangement suppresses the formation of a standing wave at a location upstream of the collector-like junction member and thus obviates the generation of undesirable high frequency exhaust noise.

Figure 9:
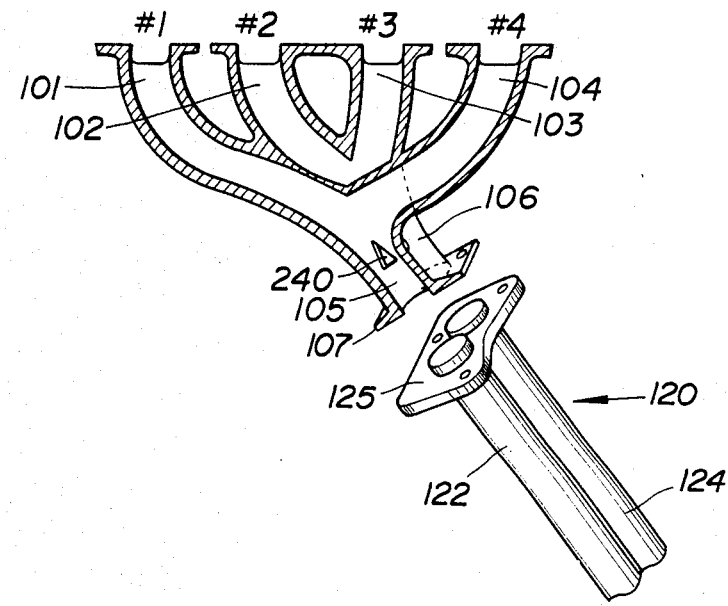
Figure 10:
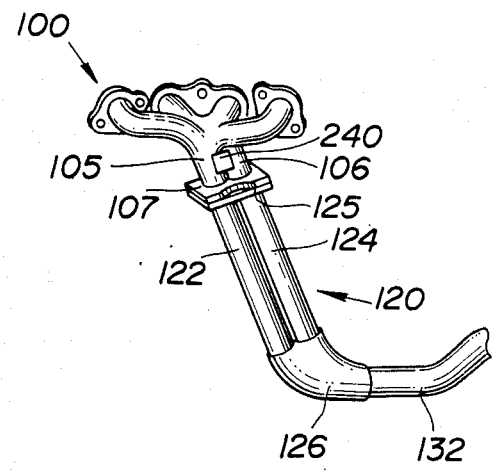

FIGS. 9 and 10 show a fourth embodiment of the present invention. This arrangement is essentially the same as that of the third and differs in that the cross-section of the transfer pasage 240 has a triangular shape rather than a circular one. With this arrangement the exhaust gas can flow smoothly between collector sections 105 and 106 to the other in a manner which reduces exhaust pressure and noise.

Figure 11:
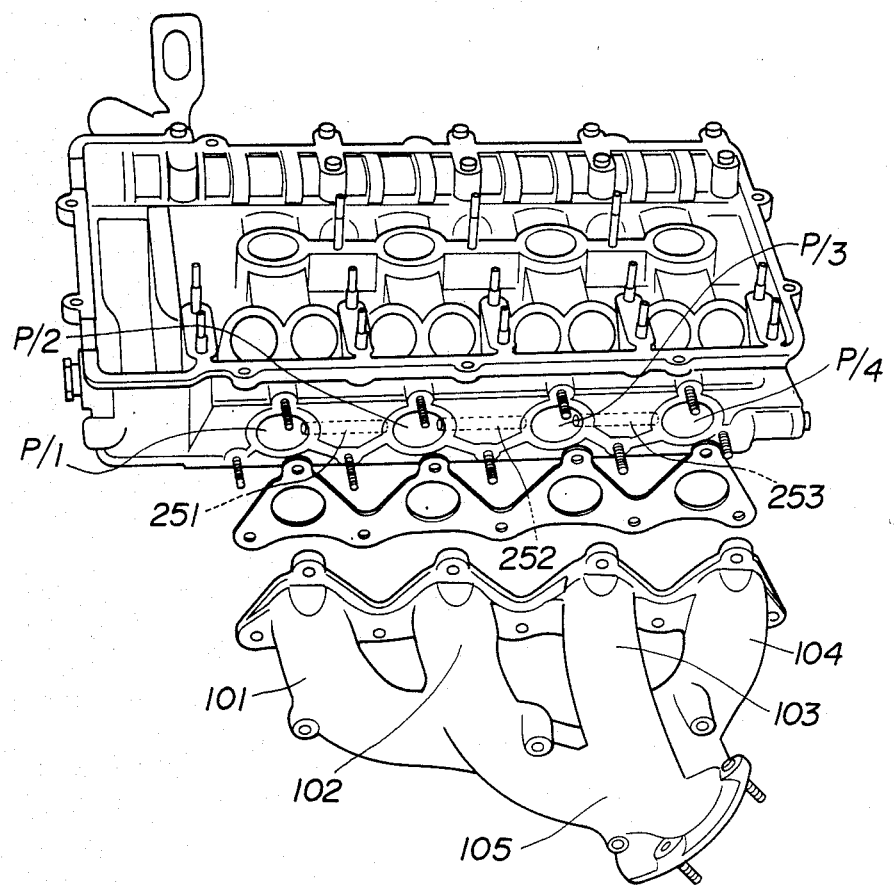
FIG. 11 shows a fifth embodiment of the present invention wherein the characterizing transfer passages are formed in the cylinder head of the engine rather than in the exhaust manifold.

FIG. 11 shows a fifth embodiment of the present invention. This embodiment differs from the previous ones in that the transfer passages which characterize the present invention are formed in the cylinder head per se rather than in the manifold. Viz., in this instance three passages 251, 252 and 253 are formed. These passages respectively interconnect exhaust ports P/1, P/2, P/3 and P/4 of cylinders #1 #2, #2 #3 and #3 #4. In this embodiment the passages 251, 252 and 253 have an essentially circular cross-section and relatively small diameter. With this arrangement when exhaust gases are released from cylinder #1 via exhaust port the pressure prevailing in port is transferred to the port of cylinder #2 and thus into branch runner 102 via transfer port 251. Subsequently upon the next slug of exhaust gases being discharged from cylinder #3 and transmitted via the associated exhaust port into branch runner 103 the pressure which has been supplied into branch runner 102 via transfer passage 251 is supplemented with that which is transferred through passage 252 and thus the formation of the standing wave between the exhaust ports and the collector-like junction member 126 is interfered with in a manner which suppresses the same and which thus prevents the generation of the undesirable exhaust noise.

What is claimed is:

1. A multi-cylinder internal combustion engine exhaust system comprising:
   a cylinder head including a plurality of exhaust ports each of which is associated with a cylinder of the engine;
   exhaust conduiting which leads to the ambient atmosphere;
   a manifold which fluidly interconnects said conduiting and said exhaust ports including first, second, third and fourth branch runners and first and second collector sections into which said first and fourth and said second and third branch runners merge respectively, said first and fourth branch runners and said first collector section defining a first exhaust gas passage structure and said second and third branch runners and said second collector section defining a second exhaust gas passage structure; and
   transfer passage means wherein said transfer passage means takes the form of first, second and third transfer passages formed in said cylinder head of said engine, said first cylinder head including first, second, third and fourth exhaust ports, said first transfer passsage fluidly interconnecting said first and second exhaust ports, said second transfer passage fluidly interconnecting said second and third exhaust ports and said third transfer passage fluidly interconnecting said third and fourth exhaust ports.

2. A multi-cylinder internal combustion engine as claimed in claim 1, wherein said exhaust conduiting further comprises:
   a first section comprised of first and second conduits, said first and second conduits fluidly communicating with said first and second passage structures of said manifold at their respective upstream ends, said first section further comprising a junction member which fluidly interconnects the downstream ends of said first and second conduits.

3. A multi-cylinder internal combustion engine as claimed in claim 2, further wherein said exhaust conduiting further comprises a second section, said second section including a first muffler device and fluidly communicates with said junction member.

4. A multi-cylinder internal combustion engine as claimed in claim 3, wherein said exhaust conduiting further comprises a third section, said third section including a second muffler device which is fluidly communicated with said second section via a center tube.

5. A multi-cylinder internal combustion engine exhaust system comprising:
   a cylinder head including a plurality of exhaust ports each of which is associated with a cylinder of the engine;
   exhaust conduiting which leads to the ambient atmosphere;
   a manifold which fluidly interconnects said conduiting and said exhaust ports including first, second, third and fourth branch runners and first and second collector sections into which said first and fourth and said second and third branch runners merge respectively, said first and fourth branch runners and said first collector section defining a first exhaust gas passage structure and said second and third branch runners and said second collector section defining a second exhaust gas passage structure; and means for preventing exhaust noise comprising transfer passage means wherein said transfer passage means takes the form of first and second transfer ports which are formed in said manifold, said first transfer port being formed in said first passage structure immediately upstream of said first collector section and in a manner to fluidly interconnect said first and second branch runners and said second transfer port being formed in said second passage structure immediately upstream of said second collector section and in a manner to fluidly interconnect said third and fourth branch runners.

6. The multi-cylinder internal combustion engine exhaust system as claimed in claim 5, wherein the engine is a four-cycle engine.

7. A multi-cylinder internal combustion engine exhaust system comprising:

a cylinder head including a plurality of exhaust ports each of which is associated with a cylinder of the engine;

exhaust conduiting which leads to the ambient atmosphere;

a manifold which fluidly interconnects said conduiting and said exhaust ports including first, second, third and fourth branch runners and first and second collector sections into which said first and fourth and said second and third branch runners merge respectively, said first and fourth branch runners and said first collector section defining a first exhaust gas passage structure and said second and third branch runners and said second collector section defining a second exhaust gas passage structure; and means for preventing exhaust noise comprising transfer passage means wherein said transfer passage means takes the form of a single passage which fluidly interconnects said first and second collector sections.

8. A multi-cylinder internal combustion engine as claimed in claim 7, wherein said single passage has a circular cross section.

9. A multi-cylinder internal combustion engine as claimed in claim 7, wherein said single passage has a triangular cross section.

10. A multi-cylinder internal combustion engine exhaust system as claimed in claim 7, wherein the engine is a four-cycle engine.

11. A four-cycle multi-cylinder internal combustion engine exhaust system comprising:

an exhaust manifold first, second, third and fourth elongate branch runners which lead from the exhaust ports of the first, second, third and fourth sequentially arranged cylinders of the engine;

a first junction at which said first and fourth branch runners merge, said first junction having a single outlet port; and a second junction at which said second and third branch runners merge, said second junction having a single outlet port;

first and second exhaust conduits, said first and second exhaust conduits being fluidly communicated with the first and second outlet ports of said first and second junctions respectively;

a third junction at which the downstream ends of the first and second exhaust conduits merge; and a single transfer passage disposed downstream of said first, second, third and fourth branch runners which interconnects said first and second junctions upstream of the first and second outlet ports thereof, said single transfer passage reducing exhaust noise generated by the passage of exhaust gases through said exhaust manifold and said first and second exhaust conduits.

* * * * *